United States Patent [19]
Sahinkaya

[11] Patent Number: 5,600,955
[45] Date of Patent: Feb. 11, 1997

[54] HYDRAULIC SERVOACTUATOR STABILIZER DEVICE

[76] Inventor: Yilmaz Sahinkaya, 993 Laguna Cir., Foster City, Calif. 94404

[21] Appl. No.: 489,028

[22] Filed: Jun. 9, 1995

[51] Int. Cl.⁶ .................................................. F16D 31/02
[52] U.S. Cl. .............................. 60/469; 180/441; 180/442; 92/80; 92/82; 60/413
[58] Field of Search .......................... 60/469; 91/375 R; 180/132; 188/31; 267/221, 217; 92/80, 82

[56] References Cited

U.S. PATENT DOCUMENTS

| | | | |
|---|---|---|---|
| 1,996,466 | 4/1935 | Ernst | 60/469 |
| 2,801,013 | 7/1957 | Pilch | 60/469 |
| 3,102,553 | 9/1963 | Ottestad | 60/532 |
| 3,196,605 | 7/1965 | Stevens | 60/469 |
| 3,550,994 | 12/1970 | Biabaud | 267/186 |
| 5,036,662 | 8/1991 | Knowlton | 60/469 |
| 5,116,188 | 5/1992 | Kurohashi et al. | 60/413 |

FOREIGN PATENT DOCUMENTS

| | | | |
|---|---|---|---|
| 1425783 | 8/1969 | Germany | 60/469 |
| 1600667 | 4/1970 | Germany | 60/477 |
| 903621 | 8/1962 | United Kingdom | 60/469 |

*Primary Examiner*—Thomas E. Denion
*Attorney, Agent, or Firm*—Don E. Erickson

[57] ABSTRACT

Unbalanced oscillatory pressures, developed on the power piston of hydraulic servoactuator systems cause vibrations on actuator housing supports. An unbalanced oscillatory force results, when two sides of the power piston are subjected to two unequal oscillatory forces induced by a disturbance. The two important disturbances are: pump flow rate oscillations, caused by power source torque oscillations; and, load oscillations. The invention is a hydraulic actuator connected in parallel to the power piston and designed to cancel vibrations by eliminating the unbalanced oscillatory pressure on the power piston. This is accomplished by designing the piston frequency of the invention, defined as tuning frequency, to be equal to the unbalanced oscillatory pressure frequency.

17 Claims, 5 Drawing Sheets

HYDRAULIC SERVOACTUATOR STABILIZER DEVICE

BACKGROUND OF THE INVENTION

The invention relates to hydraulic servoactuator devices, and more particularly to such devices that are suitable for use in automobile hydraulic rack and pinion power steering systems, thrust vector control systems for missiles, robotics devices, and the like.

A hydraulic servoactuator is an accurate and high bandwidth position control device for heavy loads. A generic hydraulic servoactuator consists, in general, of a hydraulic power system circulating fluid in a closed loop hydraulic line, a flow control valve transferring the fluid flow rate in both directions between the hydraulic line and the actuator, and an actuator with a power piston that moves the load to the commanded position in response to fluid power. The flow control valve responds to an error signal indicating the relationship between the command and instantaneous positions of the load, and diverts the pump flow rate to the power piston in such a way as to reduce the error signal towards zero in accordance with a nonlinear valve profile curve. The shape of the curve is application specific, and its slope is the valve gain which is critical in determining the bandwidth of a hydraulic servoactuator.

Figure 1:
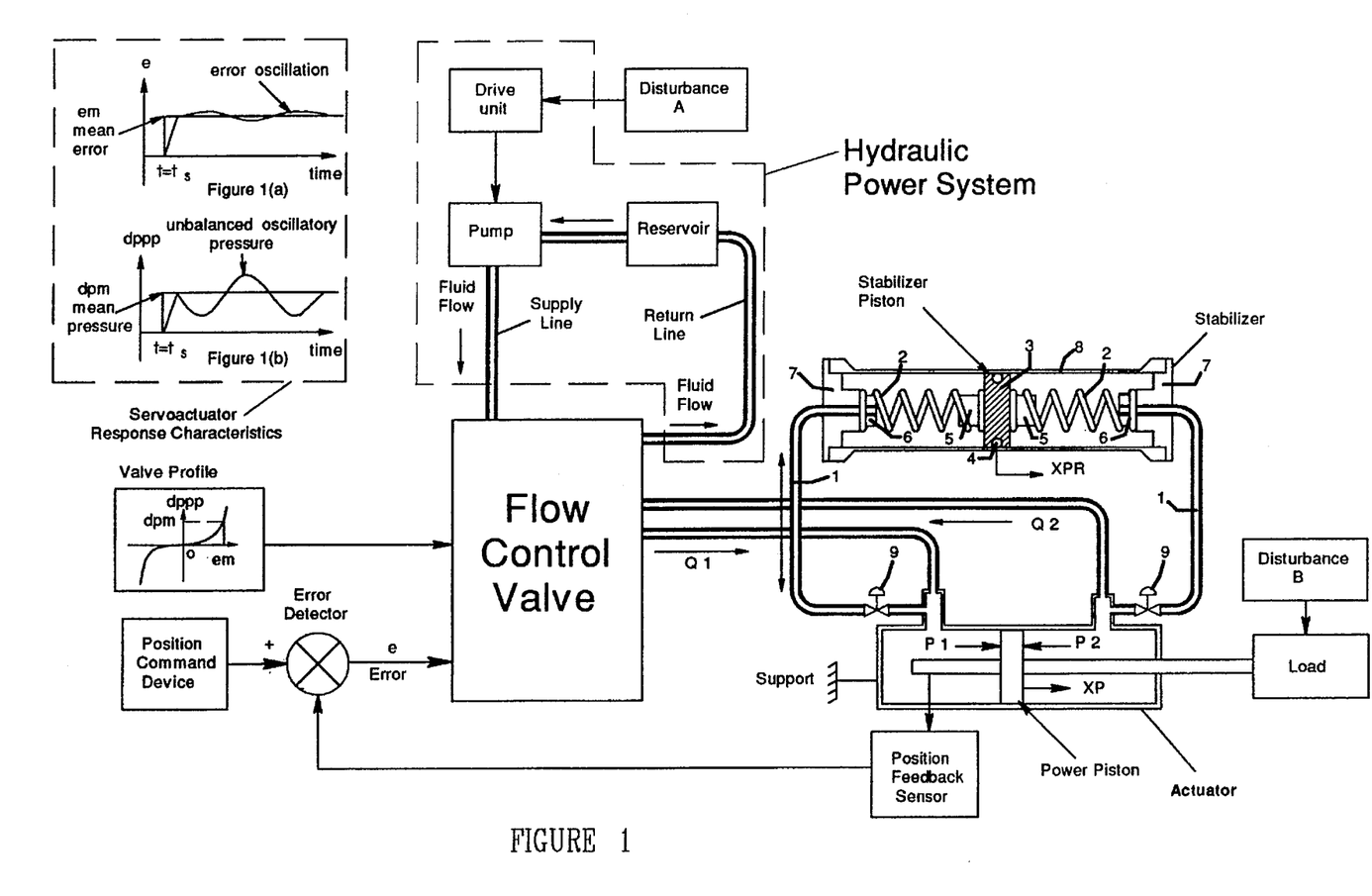
FIG. 1 depicts a general hydraulic servoactuator system using a stabilizer in parallel with the power piston of the servoactuator.

The valve profile curve describes the physical and operational characteristics of a hydraulic servoactuator. The steeper the slope of the curve at a specific error signal the faster will be the rise in pressure on the power piston. Such a hydraulic servoactuator will have a high bandwidth in load positioning. However, as described below, it may cause limit cycles. At time t=ts (where ts is the steering command starting time) a command is applied which yields an instantaneous error signal denoted by e=em (where e is the error, or relative rotary spool valve angle, and em is the mean error, both in degrees). This corresponds to a differential pressure signal denoted by dppp=dpm on the power piston (where dppp is the differential power piston pressure and dpm is the mean differential power piston pressure, both in psi). Referring to FIG. 1, the pressure dpm is equal to P1–P2 and results from the fluid flow rates difference, Q1–Q2. As the power piston position, denoted by xp (where xp is the power piston displacement from central position, in inches), changes under the action of P1–P2, an oscillatory error signal develops and is superimposed on e=em. In the exemplary embodiment of FIG. 1, if the direction of the flow rates (Q1 and Q2) is reversed, then the direction of xp and xpr is also reversed. This oscillatory error signal is induced by the oscillatory motion of the power piston resulting from the pump drive torque oscillations represented by disturbance 1 and load oscillations represented by disturbance 2. A small oscillatory error signal causes a large oscillatory pressure with the opposite polarity on the power piston. This is a salient feature of the hydraulic servoactuator operation where the flow control valve generates a force that opposes the power piston motion caused by a disturbance. The higher the flow control valve gain, the higher the amplitude of the oscillatory component of the differential pressure dppp on the power piston. The force resulting from dppp usually acts opposite to the oscillatory component of the power piston motion. This interaction between the nonlinear flow control valve operation and the oscillatory power piston motion, caused by the disturbances described above, results in pressure oscillations observed in hydraulic servoactuators such as automobile anti-lock brake and steering systems, missile thrust vector control systems and robotic devices.

If pressure oscillations in the two fluid chambers on both sides of the power piston have unequal amplitudes and the same frequencies, then an unbalanced or net oscillatory pressure wave results and, as will be understood by those skilled in the art, an oscillatory net reaction force is therefore generated at the power actuator support. If the frequency of such oscillatory reaction force approximates the structural frequencies, then vibrations will occur. If pressure oscillations in the two fluid chambers on both sides of the power piston have equal amplitudes and the same frequencies, then an unbalanced oscillatory pressure wave will not occur, an oscillatory reaction force will not be generated at the support, and vibrations will not occur.

In an automobile power steering system, the error signal is generated by a relative angle between the valve spool, connected to the steering wheel, and the valve body, rotating with the pinion, which is geared to the rack connected rigidly to the power piston. Therefore, in this application, the steering wheel is the position command device, the pinion is the position feedback sensor, and the rotary spool valve is the combined error detector and flow control valve. In a missile thrust vector control system, the error signal is generated by a relative angle between the reference nozzle tilt angle, generated by the autopilot or the flight computer, and instantaneous nozzle tilt angle, measured by a linear variable differential transformer (LVDT) sensor connected electrically to the power piston shaft. Therefore, in this case the autopilot is the position command device, the LVDT sensor is the position feedback sensor, and the servo valve is the combined error detector and flow control valve. If the large oscillatory pressure and the oscillatory power piston motion have the same polarity or zero phase angle, then it is probable that unstable pressure oscillations will occur and the vibration intensity will increase.

During automobile parking maneuvers, involving large steering angles at slow rates, a vibration type known as steering shudder with a moaning sound occurs. Engine torque oscillations, resulting in pump flow rate oscillations, and diversion of the pump flow to the power piston, develops into an unbalanced oscillatory force on the power piston.

The oscillatory motion on the power piston will demand an opposing cyclic hydraulic force from the rotary spool valve. Automobile rack and pinion power steering systems are servoactuators in which the rotary spool valve is the controller which determines an indicated hydraulic power demand in response to the relative angle between steering wheel and pinion rotation angles. Any oscillatory motion on the power piston, which is directly connected to the rack and pinion, will be fed to the rotary spool valve by the pinion acting as a feedback sensor. Since the rotary spool valve has a high power amplification, or gain, at a large relative angle, and since it always generates a large control force opposing the disturbance force on the power piston, oscillations in the forms of limit cycles will be set up across the power piston.

This unbalanced oscillatory force must be balanced by an equal and opposing reaction force at the steering gear housing frame supports. If this reaction force has a high amplitude and frequency to excite the structural frequencies, then vibrations will occur accompanied by moaning sound. This condition is called steering shudder. Since the power piston is directly connected to the rack, steering wheel vibrations will also occur if the steering shaft structural frequencies are excited by the unbalanced oscillatory force.

During city driving on bumpy roads, and highway driving, rack and pinion oscillations, caused by unequal forces from front tires and brakes, will result in a vibration type known as steering shimmy. If the unbalanced oscillatory force acting on the power piston, caused by rack and pinion oscillations, excites the structural frequencies in the steering shaft, then steering wheel vibrations will occur. In this type vibration, if the oscillatory reaction force at the steering gear housing frame supports excites the structural frequencies, then vibrations and a whining sound will occur.

Prior art has addressed the problems of vibration by means of dampening devices which isolate the vibration from the chassis or steering wheel. Exemplary prior art systems are described in U.S. Pat. No. 4,588,198 to Kanazawa, et al., U.S. Pat. No. 5,157,897 to Satoh et al., and U.S. Pat. No. 5,392,882 to Mackovjak, et al.

Some of these methods involve passive and/or active damping control devices. Most commercially used power steering system engineers apply methods involving: 1) using tuned and longer hoses in hydraulic lines, 2) reducing rotary spool valve gain, and 3) using reinforced elastomer dampers at joints in the steering shaft, tie rods and steering gear housing frame supports.

The first method described above aims to shift the fluid line frequencies away from structural frequencies. This reduces the amplitude of the unbalanced oscillatory force on the power piston, which generates smaller oscillatory reaction force at the steering gear housing frame supports and steering wheel. The second method aims to reduce the amplitude of reaction forces and reducing the unbalanced oscillatory force on the power piston. However, this method also reduces the mean value of the unbalanced force on the power piston which decreases hydraulic power assist for the driver during steering demands. The third method provides passive damping to reduce the amplitude of structural vibrations.

It is known that a 20% increase in fluid line length will demand a 20% increase in pump power for the same design fluid flow rate. It is also known that a tuner reduces the flow rate by 10% because of an increase in friction, while increasing the fluid line length, and hence requires more power from the pump. It is estimated that the combined power consumption of the above three methods is about 30% of the pump power rating.

The prior art has not recognized that the most efficient way of cancelling or reducing structural vibrations is to connect in parallel the two chambers around the power piston of the servoactuator through a pair of fluid delivery lines to the two corresponding chambers of a vibration suppressor, which chambers are separated by a piston which is supported by a pair of springs and tuned to the frequency of the unbalanced oscillatory pressure which causes the vibration. The tuning frequency is dependent on the fluid inductance of the delivery line and spring capacitance. The present invention provides an advantage over the prior art in that it positively reduces and cancels the unwanted vibrations, basically without the need of longer hoses and tubing, tuned hoses, reinforced elastomer dampers at joints in steering shafts, tie rods, and steering gear housing frame supports, or rotary spool valve with modified gain profile to allow leakage, although it is possible to use such prior art systems in combination with the present invention.

The novel features of the invention are set forth with particularity in the appended claims. The invention will be best understood from the following description when read in conjunction with accompanying drawings.

BRIEF DESCRIPTION OF THE DRAWINGS

FIG. 1(a) depicts the error oscillation waveform of the servoactuator response characteristics.

FIG. 1(b) depicts the unbalanced oscillatory pressure waveform of the servoactuator response characteristics.

SUMMARY OF THE INVENTION

An object of this invention is to eliminate vibrations at the steering gear housing supports, and steering wheel with their associated sounds. Another object of the invention is to replace inefficient and costly vibration cancellation methods presently in use. Yet another object of the invention is to save energy, space and weight.

When the stabilizer was connected in parallel with the power piston of the servoactuator so that the stabilizer piston, whose motion is denoted by xpr (where xpr is the stabilizer piston displacement from central position in inches), and the power piston moved in the same direction, and the stabilizer piston motion frequency was tuned to the frequency of the unbalanced oscillatory pressure on the power piston, the stabilizer inhibited the generation of continuous pressure oscillations. This resulted in the elimination of vibrations at actuator supports.

When the invention is applied to automobile hydraulic rack and pinion steering systems it is called "Rack and Pinion Stabilizer," or "RAPS." "RAPS" canceled the unbalanced oscillatory force on the power piston in each cycle. When the oscillatory component of fluid pressure on the power piston during the first half of the cycle was positive, fluid was transferred out of the power piston chamber into the corresponding housing cavity in "RAPS" such that the excess energy, which was supplied by unbalanced oscillatory forces, was transferred out of the power piston chamber, and stored in the resilient means of "RAPS". If this was not done, the power piston would have moved in the direction of the positive pressure force. When the oscillatory component of pressure on the power piston during the second half of the cycle was negative, fluid was brought back to the power piston chamber from the corresponding housing cavity of "RAPS". The energy deficit, which was caused by disturbance, was compensated for by bringing back the fluid from "RAPS"'s housing cavity to the power piston chamber. If this was not done, the power piston would have moved in the direction of the negative pressure force.

This operation occurred during every cycle, and equally applied to two important cases: steering shudder during parking, and steering shimmy during highway and city driving. Since disturbance frequency differs between steering shudder and steering shimmy, "RAPS" tuning frequency must be adjusted accordingly to cancel relevant vibrations. For the case of steering shudder, oscillatory pressure waves come from the pump, and "RAPS" acts like a tuned filter whose tuning frequency is equal roughly to the frequency of pump flow rate oscillation. This is because worst case shudder occurs when the pump flow rate oscillation frequency is roughly equal to one of the fluid line natural frequencies. Therefore, as the combined spring, fluid and mass system of "RAPS" oscillated, it filtered out most of the oscillatory component of the pump flow rate, and only the desirable average component of the pump flow rate reached the power piston. Hence, there were no significant unbalanced oscillatory forces on the power piston. Steering shudder and steering wheel vibrations did not occur. For the case of steering shimmy, unbalanced oscillatory force caused by rack oscillations yielded a pressure wave on the power piston. "RAPS" transferred fluid out of the power piston chamber when pressure was positive during the first half of the cycle, and brought back the fluid when pressure was negative.

"RAPS" generated an equal and opposite pressure force on the power piston, and hence canceled the rack oscillation. Therefore, in both vibration types, "RAPS" operated like a dynamic vibration absorber. When the main mass of the power piston rack system stopped oscillating, the spring and mass system of "RAPS" oscillated since "RAPS" tuning frequency was made equal to the rack oscillation frequency. The hydraulic fluid used in the exemplary embodiment is power steering fluid. However, other hydraulic fluids may be employed in other applications. The power steering fluid in "RAPS" provided the device with useful damping during its operation.

In response to the driver's steering demand, a linear motion of the power piston was followed instantaneously by the much smaller linear piston motion of "RAPS". This allowed "RAPS" to draw out a small portion of fluid from high pressure side of the power piston, while low pressure side of "RAPS" discharged the fluid into the low pressure side of the power piston. This provided a loss-less pressure damping on the power piston motion, and by allowing continuous fluid flow to the return line, during steering it prevented cavitation or formation of bubbles near the reservoir.

FIRST PREFERRED EMBODIMENT

FIG. 1 depicts a generic servoactuator system in which the present invention is embodied. A stabilizer for reducing unwanted oscillations in a hydraulic servoactuator is connected in parallel with the power piston of said servoactuator. Said stabilizer includes a housing 8 defining a cavity containing hydraulic fluid; a first and second delivery lines 1 for said hydraulic fluid communicate with opposite sides of said cavity and communicate with opposite sides of said power piston, a stabilizer piston 3 is movably disposed within said cavity so as to divide said cavity into first and second sub-cavities communicating with said first and second delivery lines 1 respectively, whereby movement of said stabilizer piston 3 changes the relative sizes of said sub-cavities; and resiliant bias means 2 for biasing said stabilizer piston 3 toward a equilibrium position. In this exemplary embodiment said resiliant bias means 2 are coil springs held in compression between one face of said stabilizer piston 3 and an end cap 7 of said housing 8. Other springs, such as bellow springs, tension springs, and other resiliant devices may be employed. The piston 3 is slidable within said cavity. The cavity may be of any geometric shape, however, the cavity of the exemplary FIG. 1 is elongated and generally cylindrical and said stabilizer piston 3 is circular in cross-section and disposed transversely across said cavity and is slidable along said housing. The fluid inductance in the delivery line 3 and the stiffness of the spring 2, and the total moving mass of said piston, springs and the fluid are selected such that said mechanism has a tuning frequency that matches the fundamental frequency of the unbalanced oscillatory pressure which causes the vibration. The tuning frequency was determined by the following equation:

$$f_{nr} = \frac{1}{2\pi} \sqrt{\frac{1}{C_r \left( L_{dl} + \frac{M_{pr}}{2A_{pr}^2} \right)}} \quad (Hz) \quad (1)$$

where $f_{nr}$ is the stabilizer tuning frequency. In Equation 1, $C_r$ is the stabilizer capacitance defined by equation, $$C_r = \frac{A_{pr}^2}{K_{pr}} + \frac{A_{dl}l_{dl}}{\beta_{dl}} + \frac{V_{cr}}{2\beta_{cr}} \quad (2)$$

where $A_{pr}$ is the piston area, $K_{pr}$ is the spring stiffness, $A_{dl}$ is the delivery line flow area, $l_{dl}$ is the delivery line length, and $\beta_{dl}$ is the fluid Bulk Modulus of fluid in the delivery line, $V_{cr}$ is the net fluid volume in the stabilizer housing, $\beta_{cr}$ is the fluid Bulk Modulus of fluid in the stabilizer housing. $L_{dl}$ is the stabilizer delivery line inductance defined by the equation, $$L_{dl} = \frac{\rho l_{dl}}{g_c A_{dl}} \quad (3)$$

where:

$\rho$ is the fluid density, $g_c$ is the gravitational constant, $M_{pr}$ is the sum of piston and spring masses.

A pair of adjustable valves 9 at the connection between stabilizer delivery lines 1 and the flow control valve of the servoactuator are included to provide fine tuning of the frequency. In the exemplary embodiment adjustable valves are used, however other adjustable orifices may be employed.

In practice, there may be more than one oscillatory pressure frequency which may give rise to vibrations with a different amplitude and frequency. Therefore, it is clear that each additional vibration causing disturbance generating an unbalanced oscillatory pressure with a specific frequency component that causes the vibration on the power piston requires its own stabilizer device in parallel with the power piston and tuned to the frequency of the unbalanced oscillatory pressure on the power piston. Although the above equations were derived in the English measurement system they are equally applicable in the metric measurement system.

SECOND PREFERRED EMBODIMENT

Figure 2:
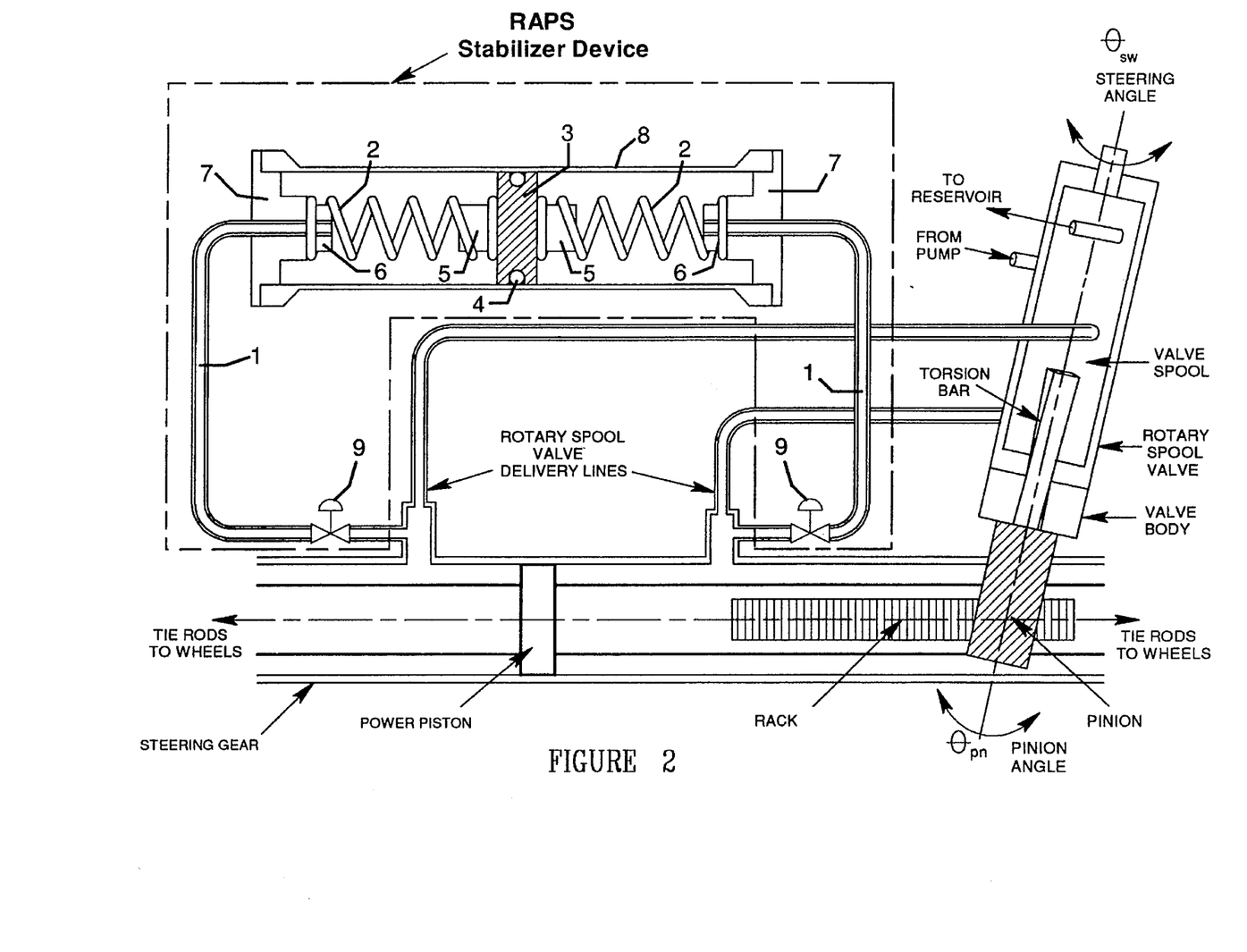
FIG. 2, not drawn to scale, shows the essential elements of "RAPS" in an automobile hydraulic rack mad pinion power steering system.

FIG. 2 shows various components of "RAPS" and details of its implementation in an automobile hydraulic rack and pinion power steering system. The "RAPS" device, which is not drawn to scale in FIG. 2., is connected to the steering gear housing with delivery lines 1.

"RAPS" includes a housing which contains a stabilizer piston 3 constrained by resiliant bias means 2 for biasing said stabilizer piston 3 toward an equilibrium position. In this exemplary embodiment said resiliant bias means 2 are coil springs held in compression between one face of said stabilizer piston 3 and an end cap 7 of said housing 8. Other springs, such as tension springs, and other resiliant devices may be employed. Both sub-cavities of the device are filled with power steering fluid which provides useful damping for the combined mass of the springs and piston during operation. The stabilizer piston 3 slides in an O-ring received by a groove in the inside surface of the liner of said housing 8.

Each bias means 2, placed between a side of the stabilizer piston 3 and an end cover 7 of said housing 8, is extended or compressed in response to disturbances. Bias means 2 design is achieved to allow linear and oscillatory motions without losing effectiveness in responding to unbalanced oscillatory force with or without a steering demand. Stabilizer piston 3, restrained by resiliant means 2, moves in the same direction as the power piston, since they are both subjected to the same pressure differential. Each bias means 2 is mounted on guides 5 and 6 with helical shaped grooves, not shown in FIG. 2, allow circumferential rotations of end coils of each spring 2 in each sub-cavity. Each end of the housing 8 is closed by an end cap 7 which provides entrance to each delivery line 1. The tuning frequency of "RAPS" piston is designed to match the frequency of the unbalanced oscillatory pressure which can be measured by a differential pressure sensor. A pair of adjustable valves 9 at the connection between "RAPS" delivery lines 1 and the steering gear are included to provide fine tuning of the frequency. Said tuning frequency being determined by the formula of the first embodiment.

A computer model corresponding to FIG. 2 was developed and used to simulate the characteristics of "RAPS". Results are shown in FIGS. 3, 4 and 5.

Figure 3:
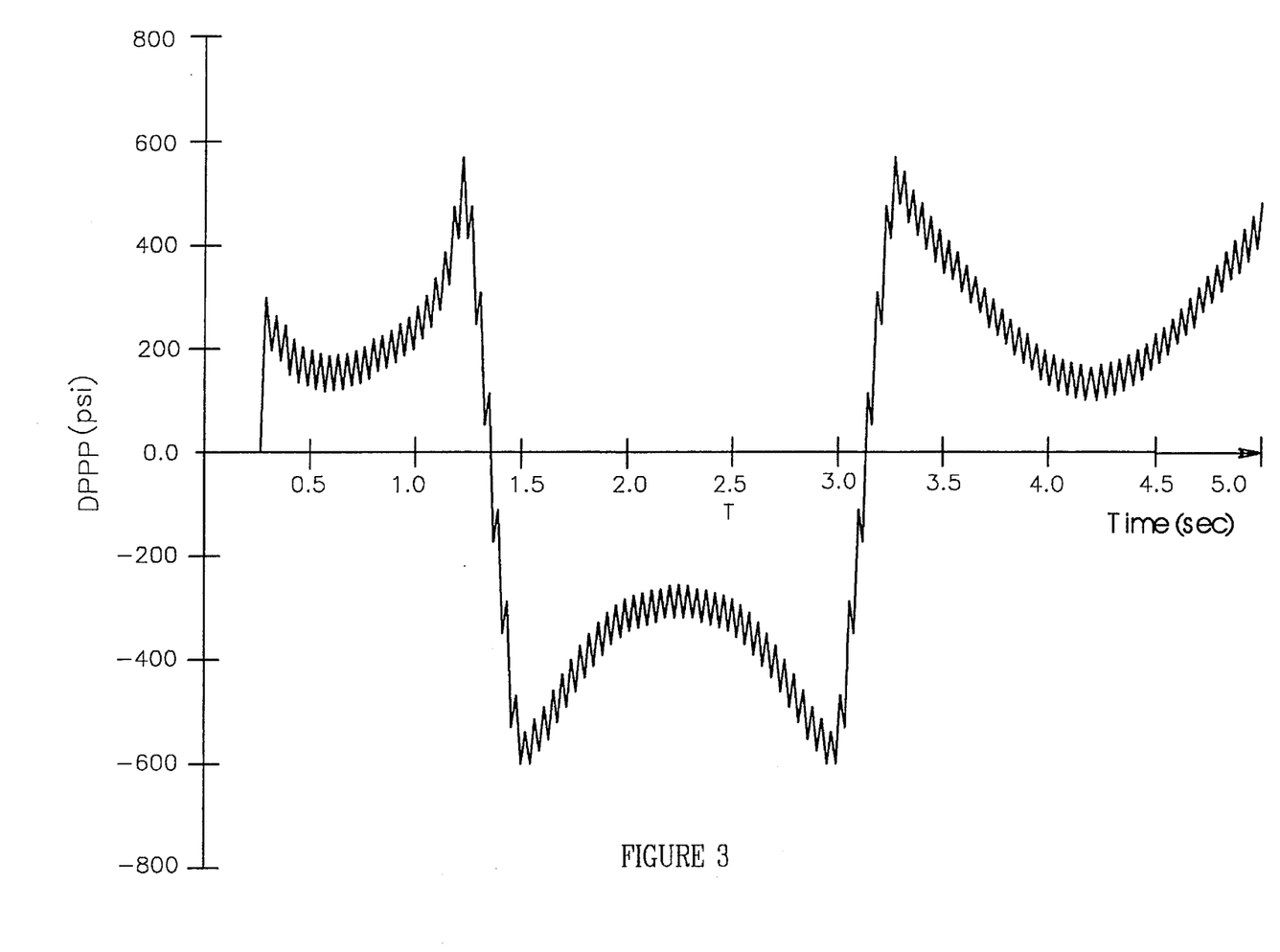
FIG. 3 shows the pressure waveform (DPPP) (in psi) acting on the power piston.

FIG. 3 shows the differential pressure waveform (DPPP) (in psi) acting across the power piston in response to a steering demand which varies sinusoidally with an amplitude of 180 degrees and a frequency of 0.25 Hertz over a period of 4 seconds. A pump speed oscillation frequency of 25 Hertz has been assumed to cause the vibration and accompanying noise. Multiplication of the oscillatory component of the pressure waveform with pressure area of the power piston yields the unbalanced oscillatory force.

Figure 4:
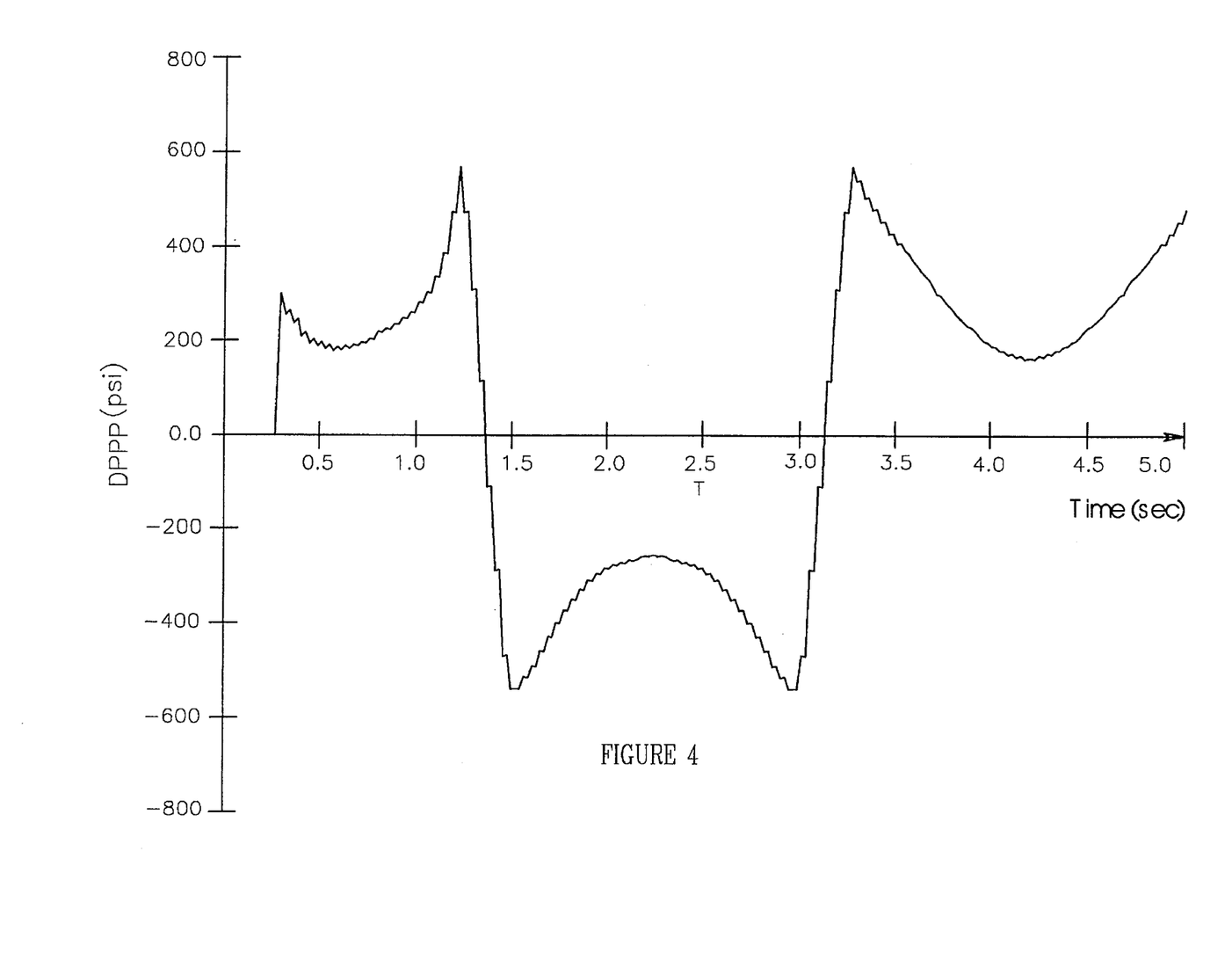
FIG. 4 shows the pressure waveform (DPPP) (in psi) acting on the power piston with "RAPS".
Figure 5:
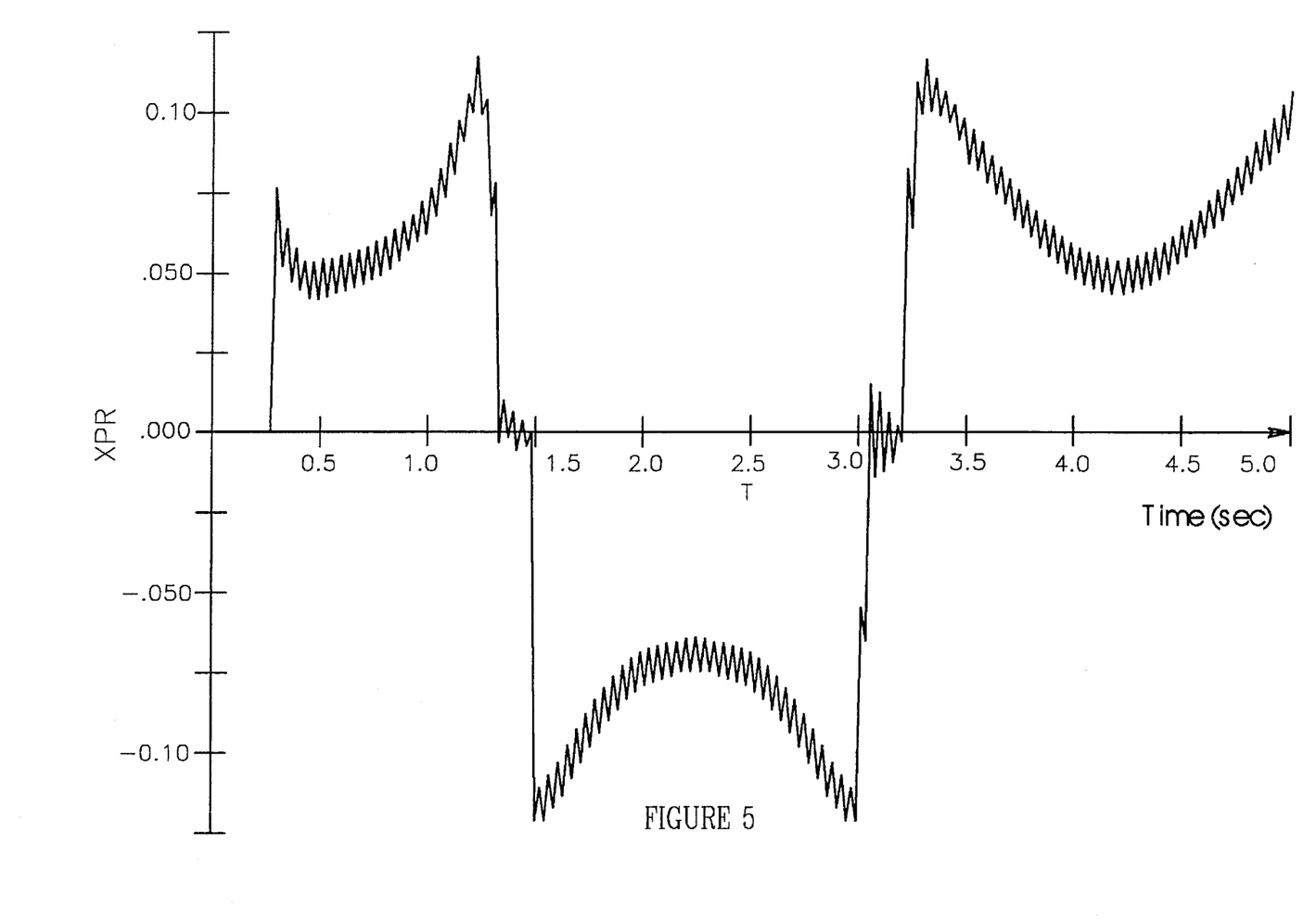
FIG. 5 shows "RAPS" piston motion (XPR) (in inches) that yields the oscillatory pressure attenuation shown in FIG. 3.

FIG. 4 shows the pressure waveform (DPPP) (in psi) acting on the power piston when "RAPS" was installed as described above.

Comparison of results in FIGS. 3 and 4 shows that a ten to one (10:1) amplitude reduction of the unbalanced oscillatory pressure was obtained using "RAPS". This means that vibration and noise will be reduced accordingly.

FIG. 5 shows "RAPS" stabilizer piston 3 motion (XPR) (in inches) that yielded the oscillatory pressure attenuation shown in FIG. 4. The frequency of oscillation of "RAPS" piston was roughly 25 Hertz, and the amplitude of "RAPS" stabilizer piston 3 motion shows beats. This was expected since the disturbance frequency differs slightly from the nearest fluid line natural frequency. As shown in FIG. 5 that, "RAPS" stabilizer piston 3 motion, during steering, has a mean and an oscillatory components. The oscillatory component gives the vibration cancellation capability to "RAPS". In practice, there may be more than one oscillatory pressure frequency which may give rise to vibrations with a different amplitude and frequency. Therefore, it is clear that each additional disturbance on the power piston requires its own "RAPS" device tuned to the frequency of the disturbance. For example, during parking, the unbalanced oscillatory pressure on the power piston causes shudder with a moaning sound. In highway driving a different oscillatory pressure, generated by rack motions caused by tires and brakes, vibrates the steering wheel. If, it is required, to cancel both of these vibrations, it may be necessary to hook up two "RAPS" devices in parallel at the same location as shown in FIG. 2.

Another embodiment of "RAPS" comprises the configuration described above, except that the mass of piston 3 is less than the mass of the springs 2 wherein said piston 3 functions primarily to divide the housing cavity 8 into two sub-cavities. Similarly, said adjustable valves 9 can be replaced by devices of similar function, such as adjustable orifices.

The two other possible solutions for such vibration problems in hydraulic servoactuators are torque-loop compensation and active vibration cancellation using microprocessors and smart sensors. These solutions are more expensive, more difficult to implement, and in general, have poorer response characteristics than a parallel hydraulic mechanical stabilizer type solution, however, it is contemplated that such solutions may be employed in conjunction with the present invention.

There has accordingly been described herein above a useful, and novel system for eliminating vibrations in steering gear frame supports, and steering wheel caused by operational and geometrical characteristics of an automobile hydraulic rack and pinion power steering system.

While the present description contains many specificities, these should not be construed as limitations on the scope of the invention, but rather as an exemplification of one/some preferred embodiment/s thereof. Many other variations are possible, for example 1) Missile Thrust Vector Control (TVC) systems using pitch and yaw hydraulic servoactuators can be stabilized by corresponding "RAPS" devices. In this case tuning frequency will depend on the structural frequencies at nozzle and missile dome attachments of each servoactuator, 2) the brake pedal pulsations caused by antilock braking system (ABS) operation can be stabilized, or reduced in amplitude, by using "RAPS" between the two delivery lines of the dual-master cylinder, and 3) a payload active suspension control system can be stabilized by installing "RAPS" across the two delivery lines to the double-acting power piston which positions the payload. Accordingly, the scope of the invention should not be determined by the specific embodiment/s illustrated herein, but the full scope of the invention is further illustrated by the claims appended hereto.

I claim:

1. A stabilizer, having components with the physical properties of dimensions and mass, for reducing unwanted structural vibrations of predetermined frequency in an a hydraulic servoactuator, said servoactuator having a power piston, such vibrations caused by an unbalanced oscillatory pressure component on such power piston, said stabilizer comprising:

a.) a housing defining a cavity for containing hydraulic fluid wherein said cavity is elongated and generally cylindrical and said piston is circular in cross-section and disposed transversely across said cavity;

b.) first and second fluid delivery lines for said hydraulic fluid communicating with opposite sides of said cavity and communicating with opposite sides of said power piston, whereby said cavity is hydraulicly arranged in parallel with said power piston;

c.) a stabilizer piston slidably disposed within said cavity so as to divide said cavity into first and second sub-cavities communicating with said first and second return lines respectively, whereby movement of said stabilizer piston changes the relative size of said sub-cavities;

d.) coil springs for biasing said stabilizer piston toward an equilibrium position;

e.) a first adjustable orifice communicating with the first sub-cavity and a second adjustable orifice communicating with the second sub-cavity, the first and second orifices to fine tune the frequency of oscillation of said stabilizer piston; and wherein the dimensions and the mass of the components thereof are selected such that said mechanism has a natural response frequency that at least partially cancels said unbalanced oscillatory pressures on said power piston.

2. The mechanism of claim 1 wherein the mass of said stabilizer piston is less than the mass of said coil springs.

3. The mechanism of claim 1 wherein said fluid delivery lines are positioned interior to said hydraulic housing.

4. The mechanism of claim 1 wherein said adjustable orifices are adjustable valves.

5. The mechanism of claim 1 wherein said natural response frequency is determined by the equation:

$$f_{nr} = \frac{1}{2\pi} \sqrt{\frac{1}{C_r \left( L_{dl} + \frac{M_{pr}}{2A_{pr}^2} \right)}} \quad (Hz)$$

wherein $f_{nr}$ is the stabilizer tuning frequency;
$C_r$ is the stabilizer capacitance defined by equation, $$C_r = \frac{A_{pr}^2}{K_{pr}} + \frac{A_{dl}l_{dl}}{\beta_{dl}} + \frac{V_{cr}}{2\beta_{cr}}$$

wherein $A_{pr}$ is the piston area;
$A_{dl}$ is the delivery line flow area;
$K_{pr}$ is the spring stiffness; $l_{dl}$ is the delivery line length;
$\beta_{dl}$ is the fluid Bulk Modulus of fluid in the delivery line;
$V_{cr}$ is the net fluid volume in the stabilizer housing;
$\beta_{cr}$ is the fluid Bulk Modulus of fluid in the stabilizer housing;
$L_{dl}$ is the stabilizer delivery line inductance defined by the equation, $$L_{di} = \frac{\rho l_{dl}}{g_c A_{dl}}$$

wherein $\rho$ is the fluid density;
$g_c$ is the gravitational constant; and
$M_{pr}$ is the sum of piston and spring masses.

6. A stabilizer, having components with the physical properties of dimensions and mass, for reducing unwanted structural vibrations of a predetermined frequency in a hydraulic servoactuator, said servoactuator having a power piston, such vibrations caused by an unbalanced oscillatory pressure component on such power piston, said stabilizer comprising:

a.) a housing defining a cavity containing hydraulic fluid;

b.) first and second fluid delivery lines for said hydraulic fluid communicating with opposite sides of said cavity and communicating with opposite sides of said power piston, whereby said cavity is hydraulicly arranged in parallel with said power piston;

c.) a stabilizer piston slidably disposed within said cavity so as to divide said cavity into first and second sub-cavities communicating with said first and second return lines respectively, whereby movement of said stabilizer piston changes the relative sizes of said sub-cavities;

d.) first and second resilient coil springs disposed on opposite sides of said stabilizer piston and urging said stabilizer piston in opposite directions, whereby said stabilizer piston is biased toward an equilibrium position;

e.) a first adjustable orifice communicating with the first sub-cavity and a second adjustable orifice communicating with the second sub-cavity, the first and second orifices to fine tune the frequency of oscillation of said stabilizer piston; and wherein the dimensions and the mass of the components thereof are selected such that said mechanism has a tuning frequency that at least partially cancels said unbalanced hydraulic oscillatory pressures on said power piston.

7. The mechanism of claim 6 wherein the mass of said stabilizer piston is less than the mass of said biasing means.

8. The mechanism of claim 6 wherein said fluid delivery lines are positioned interior to said hydraulic housing.

9. The mechanism of claim 6 wherein said adjustable orifices are adjustable valves.

10. The mechanism of claim 6 wherein said tuning frequency is determined by the equation:

$$f_{nr} = \frac{1}{2\pi} \sqrt{\frac{1}{C_r \left( L_{dl} + \frac{M_{pr}}{2A_{pr}^2} \right)}} \quad (Hz)$$

wherein $f_{nr}$ is the stabilizer tuning frequency;
$C_r$ is the stabilizer capacitance defined by equation, $$C_r = \frac{A_{pr}^2}{K_{pr}} + \frac{A_{dl}l_{dl}}{\beta_{dl}} + \frac{V_{cr}}{2\beta_{cr}}$$

wherein $A_{pr}$ is the piston area;
$A_{dl}$ is the delivery line flow area;
$K_{pr}$ is the spring stiffness; $l_{dl}$ is the delivery line length;
$\beta_{dl}$ is the fluid Bulk Modulus of fluid in the delivery line;
$V_{cr}$ is the net fluid volume in the stabilizer housing;
$\beta_{cr}$ is the fluid Bulk Modulus of fluid in the stabilizer housing;
$L_{dl}$ is the stabilizer delivery line inductance defined by the equation, $$L_{di} = \frac{\rho l_{dl}}{g_c A_{dl}}$$

wherein $\rho$ is the fluid density;
$g_c$ is the gravitational constant; and
$M_{pr}$ is the sum of piston and spring masses.

11. In an automobile having a power steering system of the rack and pinion type that includes a hydraulicly actuated power piston, a power steering system stabilizer, having components with the properties of dimensions and mass, for reducing unwanted structural vibrations of predetermined frequency caused by an unbalanced oscillatory pressure component on said power piston, said stabilizer comprising:

a.) a housing defining a cavity for containing hydraulic fluid;

b.) first and second fluid delivery lines for said hydraulic fluid communicating with opposite sides of said cavity and communicating with opposite sides of said power piston, whereby said cavity is hydraulicly arranged in parallel with said power piston;

c.) a stabilizer piston slidably disposed within said cavity so as to divide said cavity into first and second sub-cavities communicating with said first and second fluid delivery lines respectively, whereby movement of said stabilizer piston changes the relative sizes of said sub-cavities; and d.) coil springs for biasing said stabilizer piston toward an equilibrium position;

e.) a first adjustable orifice communicating with the first sub-cavity and a second adjustable orifice communicating with the second sub-cavity, the first and second orifices to fine tune the frequency of oscillation of the stabilizer piston; and wherein the dimensions and the mass of the components thereof are selected such that said mechanism has a tuning frequency that at least partially cancels said unbalanced oscillatory pressures on said power piston.

12. The mechanism of claim 11 wherein each of said springs is a resiliant coil spring between one face of said stabilizer piston and an end of said cavity.

13. The mechanism of claim 11 wherein the mass of said piston is less than the mass of said biasing means.

14. The mechanism of claim 11 wherein said fluid delivery lines are positioned interior to said hydraulic housing.

15. The mechanism of claim 11 wherein said adjustable orifices are adjustable valves.

16. The mechanism of claim 11 wherein said natural response frequency is determined by the equation:

$$f_{nr} = \frac{1}{2\pi}\sqrt{\frac{1}{C_r\left(L_{dl} + \frac{M_{pr}}{2A_{pr}^2}\right)}} \quad (Hz)$$

wherein $f_{nr}$ is the stabilizer tuning frequency;

$C_r$ is the stabilizer capacitance defined by equation, $$C_r = \frac{A_{pr}^2}{K_{pr}} + \frac{A_{dl}l_{dl}}{\beta_{dl}} + \frac{V_{cr}}{2\beta_{cr}}$$

wherein $A_{pr}$ is the piston area;

$A_{dl}$ is the delivery line flow area;

$K_{pr}$ is the spring stiffness; $l_{dl}$ is the delivery line length;

$\beta_{dl}$ is the fluid Bulk Modulus of fluid in the delivery line;

$V_{cr}$ is the net fluid volume in the stabilizer housing;

$\beta_{cr}$ is the fluid Bulk Modulus of fluid in the stabilizer housing;

$L_{dl}$ is the stabilizer delivery line inductance defined by the equation, $$L_{di} = \frac{\rho l_{dl}}{g_c A_{dl}}$$

wherein $\rho$ is the fluid density;

$g_c$ is the gravitational constant; and $M_{pr}$ is the sum of piston and spring masses.

17. In an automobile having a power steering system of the rack and pinion type that includes a hydraulicly actuated power piston, a power steering system stabilizer having a natural response frequency that matches unbalanced hydraulic oscillatory forces characteristic of said servoactuator comprising:

a.) a housing defining a cavity for containing hydraulic fluid;

b.) first and second delivery lines for said hydraulic fluid communicating with opposite sides of said cavity and communicating with opposite sides of said power piston, whereby said cavity is hydraulicly arranged in parallel with said power piston;

c.) a stabilizer piston slidably disposed within said cavity so as to divide said cavity into first and second sub-cavities communicating with said first and second return lines respectively, whereby movement of said stabilizer piston changes the relative sizes of said sub-cavities; and d.) at least one spring for biasing said stabilizer piston toward an equilibrium position;

e.) a first adjustable valve in a first end of said housing and a second adjustable valve in a second end of said housing to fine tune the frequency of oscillation of said piston; and wherein the said natural response frequency of said stabilizer is determined by the equation:

$$f_{nr} = \frac{1}{2\pi}\sqrt{\frac{1}{C_r\left(L_{dl} + \frac{M_{pr}}{2A_{pr}^2}\right)}} \quad (Hz)$$

wherein $f_{nr}$ is the stabilizer tuning frequency;

$C_r$ is the stabilizer capacitance defined by equation, $$C_r = \frac{A_{pr}^2}{K_{pr}} + \frac{A_{dl}l_{dl}}{\beta_{dl}} + \frac{V_{cr}}{2\beta_{cr}}$$

wherein $A_{pr}$ is the piston area;

$A_{dl}$ is the delivery line flow area;

$K_{pr}$ is the spring stiffness; $l_{dl}$ is the delivery line length;

$\beta_{dl}$ is the fluid Bulk Modulus of fluid in the delivery line;

$V_{cr}$ is the net fluid volume in the stabilizer housing;

$\beta_{cr}$ the fluid Bulk Modulus of fluid in the stabilizer housing;

$L_{dl}$ is the stabilizer delivery line inductance defined by the equation, $$L_{di} = \frac{\rho l_{dl}}{g_c A_{dl}}$$

wherein $\rho$ is the fluid density;

$g_c$ is the gravitational constant; and $M_{pr}$ is the sum of piston and spring masses.

\* \* \* \* \*